Oct. 6, 1964 H. BÜNTEN 3,151,730
TRANSPORTING MECHANISM FOR CONVEYOR SYSTEM
Filed May 15, 1961 3 Sheets-Sheet 2

HELMUT BÜNTEN
INVENTOR

BY: Karl F. Ross
AGENT

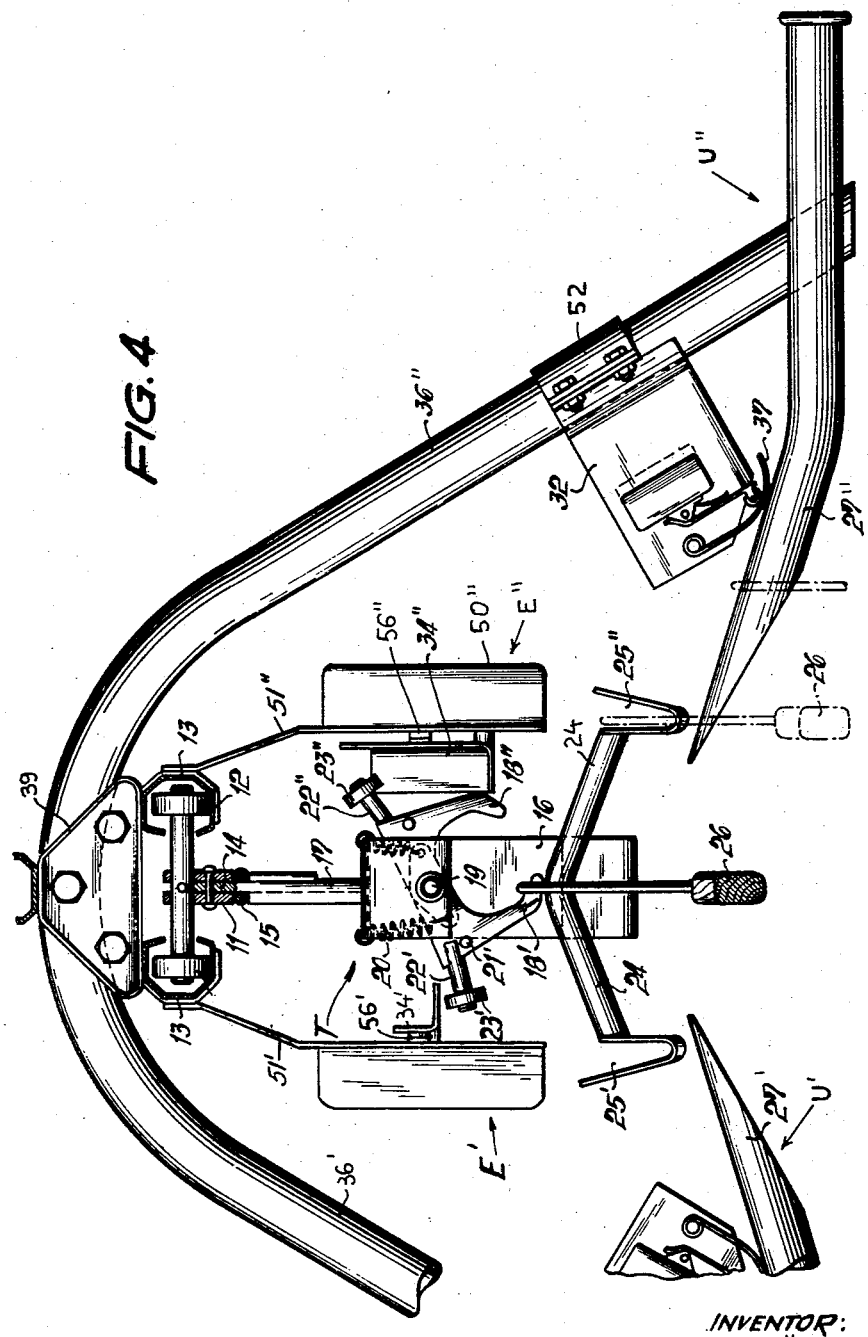

United States Patent Office 3,151,730
Patented Oct. 6, 1964

3,151,730
TRANSPORTING MECHANISM FOR
CONVEYOR SYSTEM
Helmut Bünten, Bielefeld, Germany, assignor to Durkopp-werke Aktiengesellschaft, Bielefeld, Germany, a corporation of Germany
Filed May 15, 1961, Ser. No. 109,985
Claims priority, application Germany May 18, 1960
14 Claims. (Cl. 198—38)

My present invention relates to a conveyor system having means for distributing hanging loads, particularly (but not exclusively) garments, to selected work stations located along both sides of an overhead transporter.

Whereas the problem of selectively discharging boxes, cartons or similar upstanding articles to either side of a conveyor path has been successfully solved through the use of oppositely tiltable platforms with interleaved fingers, as more fully described and claimed in U.S. Patent No. 2,969,137 owned by the assignee of the present application, difficulties have heretofore been experienced in the case of goods which could not be packaged but had to be transported on hangers. It is, therefore, an object of this invention to provide means particularly adapted to overhead conveyor systems for discharging garments or other hanging loads at a desired location toward a work station on one or the other side of the conveyor path, in accordance with either a predetermined routing schedule or a selected destination presettable by the operator upon the loading of a carrier.

The operation of a destination selector on an overhead conveyor has heretofore also entailed certain inconveniences. Thus, a conveyor designed for garments will generally have to be disposed at least 170 cm., or close to five feet, above floor level if a dragging of the goods along the ground is to be avoided. A seated operator engaged in loading a passing carrier must do so at the instant of its closest approach, this being also the most convenient moment for setting a selector on such carrier. Since the two operations are mutually exclusive, the conveyor must travel at a relatively slow rate if both tasks are to be carried out properly and without requiring the operator to rise. My invention, accordingly, has as a further object the provision of means for enabling the setting of a selector at a comfortable interval before or after the passage of an associated load carrier on an overhead conveyor.

A more particular object of this invention, allied with the preceding one, is to provide destination-selector means on an overhead conveyor accessible with equal facility to operators on both sides of the conveyor path.

In accordance with a feature of the present invention I provide, in an overhead conveyor system designed for the transport of garments or other goods carried on hangers, a pair of jaws swingable in opposite directions (preferably about a common axis) in a plane transverse to the direction of conveyor movement, these jaws having normally overlapping extremities jointly engageable with a hanger hook above the vertex of a generally inversely V-shaped support which, upon a withdrawal of one or the other jaw, enables the hanger hook to slide down in a respective direction along a corresponding guide ridge of the support. These flanks, advantageously, terminate in substantially flat-bottomed lugs of generally J-shaped profile which intercept the downwardly sliding hooks and carry them toward a fixed unloading arm designed to take them off the carrier and to hold them at the disposal of the operator at that particular work station. The latter may now deposit the hook of another hanger on the carrier, with the beak of the hook facing forwardly to facilitate its removal at a subsequent station.

Another feature of my invention resides in the provision of a separate carrier for the destination selector associated with a particular load carrier but spaced from the latter along the conveyor so as to trail or to lead the load carrier by a distance sufficient to afford the operator ample time to complete the deposition of a new hanger on the load carrier before indicating the new destination of such carrier, or vice versa, though both operations are carried out while the respective carrier is closest to the operator's position. A controller adjusted to a pattern characteristic of the associated work station, arranged ahead of the operator's position, co-operates with a correspondingly preset selector to release the hanger of the load carrier by placing a trip member in the path of a camming element on one or the other hook-suspending jaw so as to initiate the aforedescribed discharging operation.

The above and other objects, features and advantages of the present invention will be more readily apparent from the following detailed description, given with reference to the accompanying drawing in which:

FIG. 4 is a view similar to FIG. 2 but drawn to a larger scale and illustrating the discharging of the load;

FIG. 5 is a view of the selector carrier and the associated controller, taken on the line V—V of FIG. 1; and FIG. 6 is a circuit diagram of the various switching devices forming part of the system of FIGS. 1–5.

Figure 1:
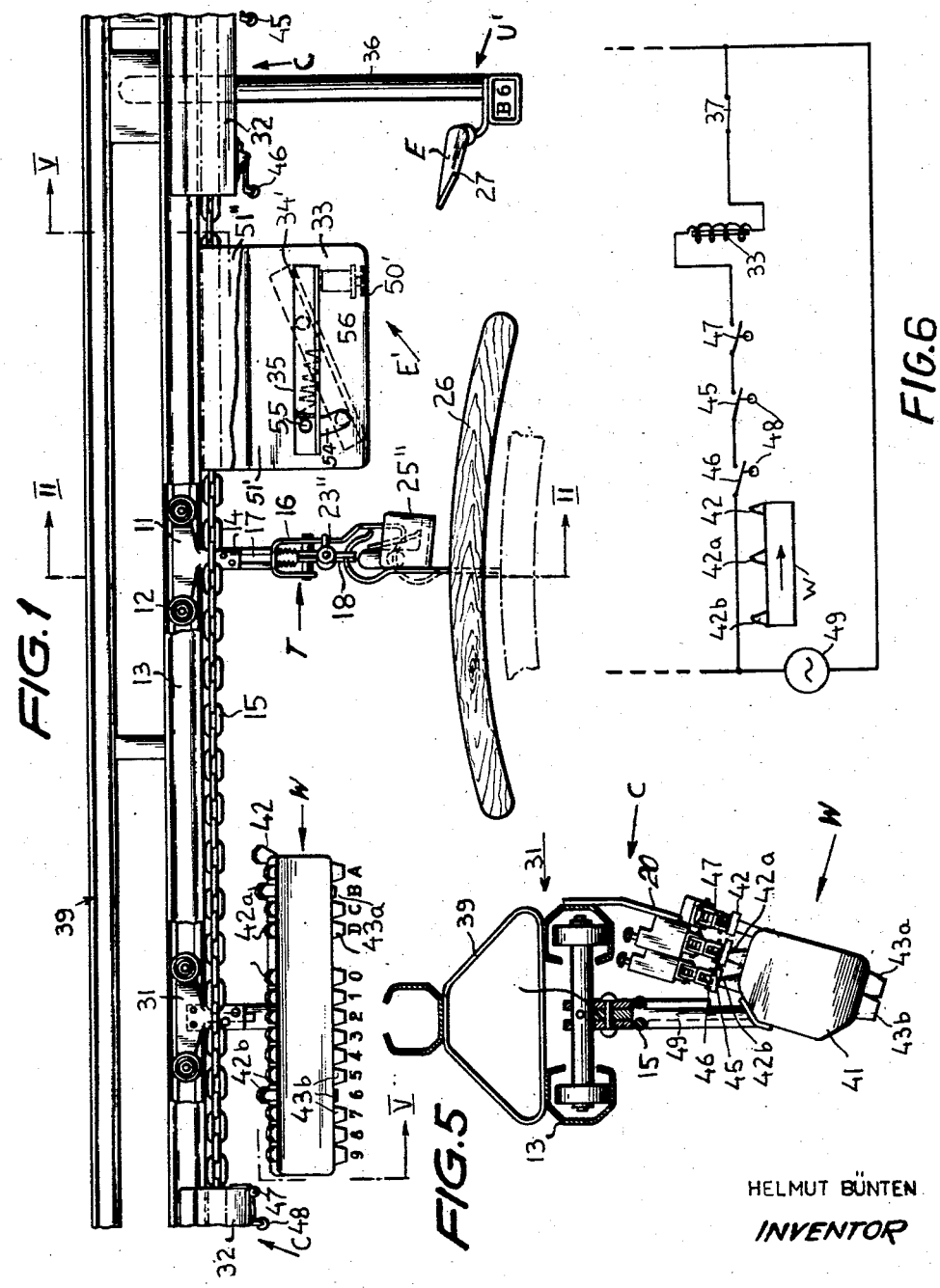
FIG. 1 is a side elevation of a part of a conveyor installation according to the invention, depicting a load carrier with associated selector carrier and release and unloading mechanisms controlled thereby.
Figure 2:
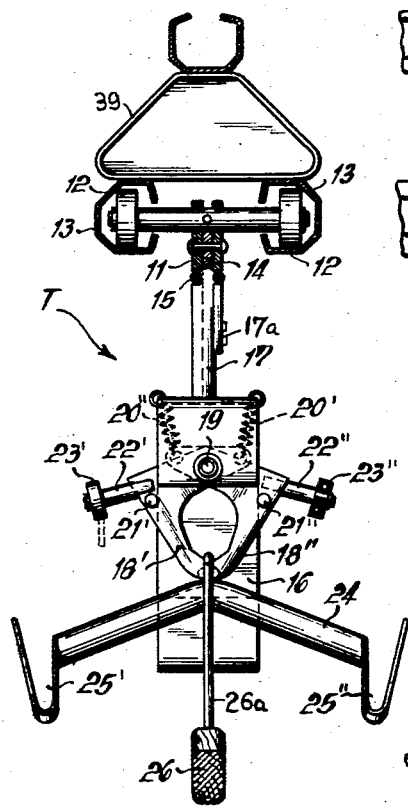
FIG. 2 is a view of the load carrier taken on line II—II of FIG. 1.

The conveyor system shown in FIGS. 1–5 comprises a supporting frame 39 provided with rails 13 along which there are transported a load carrier T and a selector carrier W which are hooked in longitudinally spaced relationship to a movable endless chain 15 propelled by a conventional sprocket drive not shown. Along and on both sides of the conveyor path there are situated a number of work stations serving as potential destinations for loads transported by the conveyor. Each work station is served by a release mechanism E' or E'' and an unloading device V' or V'' immovably connected with the frame 39 and associated with a fixed controller C. The carrier T comprises a trolley 11 provided with rollers 12 which are guided on the rails 13. A connecting piece 14 fastened at one end to the trolley 11 passes through a link of the chain 15.

Below chain 15 the connecting piece 14 is embraced on three sides by a bracket 17 and on the fourth side by a plate 17a fastened to the members 14, 17 by screws 17b; removal of these screws enables the piece 14 to be withdrawn from chain 15 for inspection and repair of the load carrier T or for its relocation along the chain, e.g. in order to vary its spacing from the associated selector carrier W in accordance with changes in the conveyor speed. A bent sheet-metal strip 16, suspended from bracket 17, supports a pivot pin 19 on which there are swingably mounted a pair of depending, generally elbow-shaped, jaws 18', 18'' which are urged by respective tension springs 20', 20'' into a normal position illustrated in FIG. 2. In this position, defined by contact of a pair of abutment pins 21', 21'' with the edges of strip 16, the lower ends of jaws 18', 18'' overlap above the vertex of an inverted-V-shaped deflector bar 24 fastened to the lower bend of that strip. Bar 24, sloping downwardly on each side of the plane of symmetry of the conveyor, is provided on each end with a respective hook-catching lug 25', 25'' of generally J-shaped configuration, the longer leg of the J projecting above the ends of bar 24 while the shorter leg, fastened to the bar, is forwardly cut back as seen in dotted lines in FIGS. 1 and 3. Each jaw 18′, 18″ carries an outwardly extending stud 22′, 22″ having journaled thereon a roller 23′, 23″ which, when lifted out of its normal position against the force of spring 20′ or 20″, swings the respective jaw about its fulcrum 19 into a retracted position, as illustrated for the jaw 18″ in FIG. 4.

Figure 3:
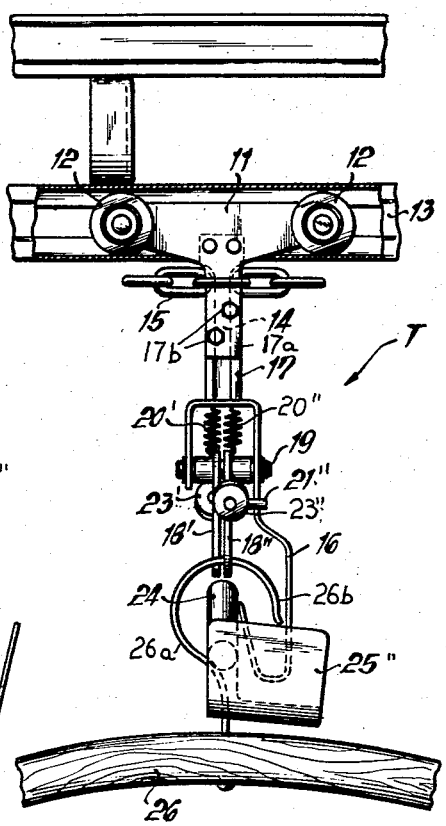
FIG. 3 shows the carrier in the same view as FIG. 1 but on a larger scale.
Figure 4A:
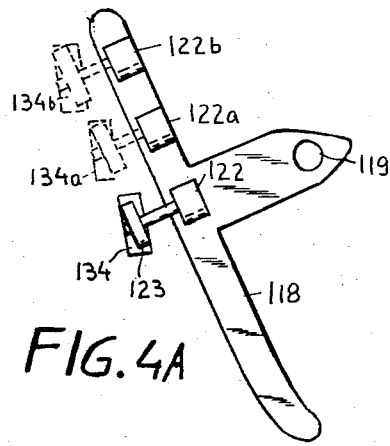
FIG. 4A is a fragmentary view similar to FIG. 4, showing a modification.

The overlapping tips of jaws 18′, 18″ in their normal, operative position engage the hook 26a of a clothes hanger 26 which is thereby held above the vertex of bar 24 with its beak 26b facing forwardly in the direction of conveyor travel, i.e. to the right as viewed in FIGS. 1 and 3. The hook-engaging tips of these jaws are inwardly beveled, as best seen in FIG. 4, whereby the hook 26a is caused to slip from such tip onto the opposite flank of bar 24 upon the withdrawal of the corresponding opposite jaw.

The lifting of roller 23′ or 23″ at a particular work station, representing the destination of a garment carried on a hanger 26, is accomplished by a suitable tripping device forming part of the release mechanism E′ or E″ on one or the other side of conveyor frame 39. This mechanism is here shown to comprise a ramp 34′ or 34″ which is swingable about a pivot 56′ or 56″ on a bracket 51′ or 51″ depending from frame 39. A stud 55′ or 55″ passes through an arcuate slot 54 (FIG. 1) in the corresponding bracket and is engaged, within a housing 50′ or 50″, by a toggle spring 35 adapted to hold it in either a nearly horizontal position (solid lines, FIG. 1) or a sloping position (dot-dash lines) as further illustrated in FIG. 4 for the ramps 34′ and 34″, respectively. A solenoid 33 in housing 50′ or 50″, when energized, flips the associated ramp into its sloping position in which it can lift up an oncoming roller, as illustrated for roller 23″ in FIG. 4, to swing the respective jaw (18″) into its hook-releasing position whereby the hanger 26 is free to slide along the corresponding downwardly sloping ridge of bar 24 until it is intercepted by the J-shaped lug (25″) at the end thereof, its beak 26b coming to rest on the bottom of a longitudinally extending trough formed by this lug. Now the hook 26a, as illustrated in dot-dash lines in FIGS. 1 and 4, lies in the path of one of two unloading arms 27′, 27″ projecting toward the conveyor path from opposite sides, i.e. the arm 27″ in the position of FIG. 4, whereby the hanger is stripped off its lug so as to slide along the sloping end of the unloading arm and to remain thereon until removed therefrom by the operator of the work station of which this arm forms a part. Arms 27′, 27″ are carried on bars 36′ and 36″, respectively, depending from the frame 39; these arms are advantageously somewhat flexible so that a switch 37, carried by each bar 36′, 36″ on a support 52 and normally held closed by the respective unloading arm 27′ or 27″, is opened when a predetermined maximum number of loaded hangers 26 are deposited on such arm. The circuit breaker 37, when thus opened, deactivates the corresponding release mechanism E′ or E″ as described hereinafter with reference to FIG. 6.

Each ramp 34′, 34″ has a rear extremity which, in its sloping operative position, extends upwardly so as to be depressed by a passing roller 23′ or 23″ which restores the ramp to normal.

In smaller installations, in which a supervisor at a control post can oversee the entire layout, the trip solenoid 33 may be operated manually from such post as a particular carrier T approaches its destination, e.g. as described in commonly assigned U.S. Patent No. 2,901,082. In other instances, particularly in those cases where each carrier has assigned to it a predetermined route including certain work stations, different carriers may be distinguished from one another by a different location of their trip rollers or equivalent camming elements so that any such roller can be displaced only at a station equipped with a correspondingly positioned ramp member. This has been illustrated in FIG. 4A where the jaw 118, swingable about its pivot 119, is provided with three spaced-apart mountings 122, 122a, 122b for the roller 123 which is thus selectively positionable, at the start of the journey of its carrier, to co-operate with a selected one of three sets of ramps 134, 134a, 134b provided at different groups of work stations; in similar manner the second jaw, not shown in FIG. 4A, may be adjustable for actuation by selected ramps.

In the preferred embodiment illustrated in FIGS. 1–6, however, the destination of any load carrier T can be preselected by the operator of any work station by means of a selector 41 forming part of the trailing carrier W. The selector, suspended from a trolley 31 and connected with it and with the chain 15 by a link 40 similar to the assembly 14, 17 of load carrier T, is here shown provided on its underside with push buttons 42a, 43b arranged in two transversely offset and longitudinally spaced rows of four and ten buttons, respectively. Push buttons 43a may conveniently carry, at their lateral faces visible to the operators on both sides of the track 13, 39, alphabetic legends "A" to "D" whereas push buttons 43b similarly carry numerical legends "0" to "9", any of forty stations being thus identifiable by a combination of a letter with a digit ranging from "A0" to "D9." Each of the buttons 43a and 43b controls a respective knob 42a and 42b extending upwardly from the housing of selector 41 so as to project into the path of relative motion of a roller-carrying test switch arm 45 and 46, respectively, upon being actuated by the corresponding push button. A further knob 42, transversely offset from the rows of knobs 42a and 42b, fixedly projects into the path of a third or reference switch arm 47. The switch arms 45, 46, 47 are carried on a controller C associated with each work station and suspended from the frame 39, the relative longitudinal spacing of the camming rollers 48 of these arms being so chosen on each controller as to effect simultaneous closure of all three switches only in response to a matching pushbutton setting of a selector 41. As shown in FIG. 6, such simultaneous closure completes an energizing circuit for the solenoid 33 from a suitable power source 49 if the break contacts of switch 37 are closed. The arrangement just described is similar to the one disclosed in commonly assigned co-pending application Ser. No. 857,353 filed December 4, 1959, now U.S. Patent No. 3,040,912.

As illustrated in FIG. 1, the controller C for a pair of associated work stations may be positioned immediately beyond the release mechanisms E′, E″ of the immediately preceding pair of stations. The slightly inclined suspension of selector 41 shown in FIG. 5 brings the buttons 43a, 43b thereof into a central position in which they are conveniently accessible to the operators on the left and on the right of the conveyor.

The specific type of selector used is, of course, a matter of choice, as is the particular trip mechanism designed to place a ramp in the path of one of the camming rollers 23′ and 23″. The invention, accordingly, is capable of being realized in various modifications of the arrangement described and illustrated, without departing from its spirit and scope, except as limited in the appended claims.

I claim:

1. In a system for the transportation of loads suspended from hangers having hooks, in combination, an overhead conveyor movable along a predetermined track, a plurality of work stations positioned on opposite sides of said track, at least one carrier suspended from said track, a pair of co-operating jaws swingable on said carrier in opposite directions in a plane substantially transverse to the conveyor motion, said jaws being provided with inversely sloping hook-engaging extremities overlapping each other in a normal position of said jaws, support means mounted on said carrier adjacent said jaws and forming a pair of oppositely inclined hook-guiding ridges each sloping downwardly from the hook-engaging extremity of a respective jaw whereby a hanger hook held between said extremities is free to slide down along a respective ridge upon the withdrawal of the other jaw, cam means on each of said jaws, and trip means positioned alongside said track at different work stations for respective engagement with the cam means of either of said jaws in a sense swinging the latter out of its normal position, thereby releasing an engaged hook and initiating its outward sliding along a respective ridge of said support means.

2. The combination according to claim 1, further comprising catch means at the end of each of said ridges for intercepting an outwardly sliding hook, and stationary unloading means positioned alongside said track at each of said work stations for stripping an intercepted hook from said catch means.

3. The combination according to claim 2 wherein said catch means comprises a generally J-shaped lug secured to said support means by the short leg of the J and forming a trough extending generally in the direction of conveyor motion, said unloading means including an arm with an upwardly sloping end positioned just below the path of said lug.

4. The combination according to claim 1 wherein said support means comprises a bar of generally inverted-V shape having a vertex positioned immediately below said hook-engaging extremities in their normal position.

5. A carrier according to claim 4, further comprising respective transverse troughs on said support means beyond said ridges adapted to support a hook in position to be stripped off along said troughs.

6. The combination according to claim 4 wherein said jaws are generally elbow-shaped and have upper ends provided with a common pivot pin fastened to said carrier, said hook-engaging extremities constituting lower ends of said jaws and being provided with beveled faces substantially in line with respectively opposite flanks of said bar.

7. The combination according to claim 1 wherein said conveyor comprises a chain and rail means alongside said chain, said carrier comprising a trolley supported by said rail means, a connecting element depending from said trolley and traversing a link of said chain, and a member suspended from said element below said chain, said jaws being pivotally mounted on said member.

8. In a system for the transportation of loads suspended from hangers having hooks, in combination, an overhead conveyor movable along a predetermined track, a plurality of work stations positioned on opposite sides of said track, a plurality of load carriers suspended from said track, a pair of co-operating jaws swingable on each of said load carriers in opposite directions in a plane substantially transverse to the conveyor motion, said jaws being provided with inversely sloping hook-engaging extremities overlapping each other in a normal position of said jaws, support means mounted on each of said load carriers adjacent said jaws and forming a pair of oppositely inclined hook-guiding ridges each sloping downwardly from the hook-engaging extremity of a respective jaw whereby a hanger hook held between said extremities is free to slide down along a respective ridge upon the withdrawal of the other jaw, cam means on each of said jaws, a plurality of station selectors on said conveyor each positioned next to a respective load carrier, controller means positioned adjacent each of said work stations for actuation by a matchingly adjusted selector, and trip means positioned alongside said track at each of said work stations and connected to the associated controller means for operative displacement thereby in response to actuation of the latter by such selector, said trip means upon said operative displacement being inclinedly positioned along the path of the cam means of either of said jaws for swinging the latter out of its normal position, thereby releasing an engaged hook and initiating its outward sliding toward a selected work station along a respective ridge of said support means.

9. The combination according to claim 8 wherein said trip means comprises a mounting, a ramp member movably held on said mounting, spring means tending to maintain said ramp member in either of two positions including an inoperative and an operative position, and electromagnetic means actuatable by said controller means for flipping said ramp member from its inoperative into its operative position.

10. The combination according to claim 9 wherein said ramp member has a pivot and a rear extremity beyond said pivot displaceable by said cam means for restoring said ramp member to its inoperative position.

11. The combination according to claim 8 wherein each of said work stations is provided with unloading means positioned alongside said track for receiving a released hook from said support means, said unloading means including a resilient arm and circuit-breaker means controlled by said arm for disabling said trip means in response to a predetermined maximum loading of said arm.

12. The combination according to claim 8 wherein said selector means comprises a separate carrier spaced from said load carrier along said track, and pushbutton-controlled means on said separate carrier, said controller means including test means engageable by said pushbutton-controlled means upon the passage of said separate carrier.

13. The combination according to claim 12 wherein said separate carrier trails said load carrier, the controller means for a given work station being positioned along said track just beyond a preceding work station in the direction of conveyor movement.

14. The combination according to claim 8 wherein said work stations are arranged in facing pairs, the trip means of each pair of work stations being connected to a common controller means.

References Cited in the file of this patent

UNITED STATES PATENTS

| | | |
|---|---|---|
| 1,247,535 | Huddleston | Nov. 20, 1917 |
| 2,776,043 | Spillers | Jan. 1, 1957 |
| 2,990,049 | Gerbe | June 27, 1961 |
| 2,993,584 | Winz | July 25, 1961 |